(12) United States Patent
Jaeger et al.

(10) Patent No.: US 12,109,570 B2
(45) Date of Patent: Oct. 8, 2024

(54) BALL MILL COOLING SYSTEM AND METHOD

(71) Applicants: CPS Technology Holdings LLC, New York, NY (US); Clarios Germany GmbH & Co. KG, Hannover (DE)

(72) Inventors: Jason J. Jaeger, Milwaukee, WI (US); Tobias Kuptz, Wunstorf (DE); Morten Schneegans, Wennigsen (DE); Brett Ware, Maryville, MO (US); Sean Riley, Milwaukee, WI (US); James D. Schleusner, St. Joseph, MO (US)

(73) Assignees: CPS Technology Holdings LLC, New York, NY (US); Clarios Germany Gmbh & Co. KG, Hannover (DE)

( * ) Notice: Subject to any disclaimer, the term of this patent is extended or adjusted under 35 U.S.C. 154(b) by 569 days.

(21) Appl. No.: 17/293,070

(22) PCT Filed: Nov. 12, 2019

(86) PCT No.: PCT/US2019/060978
§ 371 (c)(1),
(2) Date: May 12, 2021

(87) PCT Pub. No.: WO2020/102230
PCT Pub. Date: May 22, 2020

(65) Prior Publication Data
US 2021/0394192 A1    Dec. 23, 2021

Related U.S. Application Data

(60) Provisional application No. 62/759,969, filed on Nov. 12, 2018.

(51) Int. Cl.
*F27B 7/38*         (2006.01)
*B02C 17/04*        (2006.01)
(Continued)

(52) U.S. Cl.
CPC .......... *B02C 17/1815* (2013.01); *B02C 17/04* (2013.01); *C01G 21/02* (2013.01); *F27B 7/386* (2013.01)

(58) Field of Classification Search
CPC ........ F23G 2203/208; F27B 7/14; F27B 7/38; F27B 7/386; F27B 7/40; F27B 7/383; F27D 15/028; B02C 17/16
See application file for complete search history.

(56) References Cited

U.S. PATENT DOCUMENTS 2,507,295 A * 5/1950 Borch ................. F27B 7/38
                                          165/104.31
3,692,286 A * 9/1972 Borreill .............. C04B 7/47
                                          432/61
(Continued)

FOREIGN PATENT DOCUMENTS

CN   103212471 A   7/2013
CN   104475202 A   4/2015
(Continued)

OTHER PUBLICATIONS

International Search Report and Written Opinion of the International Searching Authority dated Feb. 21, 2020, for PCT/US2019/060978 filed Nov. 12, 2019.

*Primary Examiner* — Gregory A Wilson
(74) *Attorney, Agent, or Firm* — Boardman & Clark LLP

(57) ABSTRACT

A cooling system for a ball mill used for production of a lead oxide is disclosed. The system has an internal nozzle configured to introduce water into an interior of a rotating ball mill drum, and a water conduit on an exterior of the rotating drum and configured for external water delivery so as to deliver water on the drum exterior. A control system may also be provided for control of the cooling system. A method is also disclosed.

20 Claims, 9 Drawing Sheets

(51) Int. Cl.
    *B02C 17/18*    (2006.01)
    *C01G 21/02*    (2006.01)

(56) References Cited

U.S. PATENT DOCUMENTS

| | | | | |
|---|---|---|---|---|
| 5,704,557 | A | * | 1/1998 | Hallett ...................... F23G 7/00 |
| | | | | 241/176 |
| 6,132,560 | A | * | 10/2000 | Gerstenkorn ........... C10B 39/10 |
| | | | | 432/118 |
| 6,228,143 | B1 | * | 5/2001 | Aiken ..................... F23G 7/003 |
| | | | | 429/49 |
| 2006/0039852 | A1 | | 2/2006 | Trischan et al. |

FOREIGN PATENT DOCUMENTS

| | | | | | |
|---|---|---|---|---|---|
| CN | 204656652 | U | * | 9/2015 | |
| CN | 113237343 | A | * | 8/2021 | ............ B01D 47/06 |
| DE | 1467297 | A1 | | 3/1969 | |
| DE | 3039212 | A | * | 5/1982 | ............... F27B 7/38 |
| EP | 3239635 | A1 | * | 11/2017 | |
| FR | 684413 | A | | 6/1930 | |
| GB | 326834 | A | | 3/1930 | |
| GB | 1017202 | A | | 1/1966 | |
| KR | 200230851 | Y1 | * | 11/2001 | |
| WO | WO-0053818 | A1 | * | 9/2000 | ............... B03C 1/14 |

\* cited by examiner

BALL MILL COOLING SYSTEM AND METHOD

CROSS-REFERENCE TO RELATED APPLICATIONS

This application is a 371 national phase entry of International Application No. PCT/US2019/060978, filed Nov. 12, 2019, which claims priority to and the benefit of U.S. Provisional Patent Application Ser. No. 62/759,969, filed Nov. 12, 2018, entitled BALL MILL OXIDE COOLING SYSTEM & METHOD, the contents of each of which is hereby incorporated herein by reference in its entirety.

FIELD

The present inventions relate to the field of production of oxides. The present inventions more specifically relate to the field of production of lead oxides. The present inventions also relate to the field of batteries (e.g., lead-acid batteries including batteries for vehicle starting, lighting and ignition applications; marine batteries; commercial batteries; industrial batteries; batteries for use with hybrid-electric vehicles, microhybrid vehicles, etc.), and lead oxides for use with such batteries.

BACKGROUND

Lead oxide is often used to create the paste used on the battery plates of lead-acid batteries. That is, lead oxide may be used to make a paste which is spread onto grids for use in forming an electrode of a lead-acid battery. After chemical conversion, the paste becomes the active material.

In more detail, a positive plate of a lead acid battery may contain a substrate with lead dioxide active material or paste thereon. Examples of lead-containing compositions which may be employed in the positive paste include, but are not limited to, finely-divided elemental Pb, PbO ("litharge" or "massicot"), Pb3O4 ("red lead"), PbSO4 ("Lead sulfate" with the term "PbSO4" being defined to also include its associated hydrates, and basic sulfates: 1PbO·PbSO4, 3PbO·PbSO4·H2O, 4PbO·PbSO4), and mixtures thereof.

Different materials may be used in connection with the lead-containing paste composition, with the present invention not being restricted to any particular materials or mixtures (added fibers, or other constituents). These materials may be employed alone or in combination as determined by numerous factors, including for example, the intended use of the battery and the other materials employed in the battery.

The negative plate may likewise be composed of a substrate with a spongy lead active material or paste thereon. The negative paste may be substantially similar to the positive paste but may also vary. Example lead-containing compositions which may be employed in the negative paste include but are not limited to finely-divided elemental Pb, PbO ("litharge" or "massicot"), Pb3O4 ("red lead"), PbSO4 ("Lead sulfate" with the term "PbSO4" being defined to also include its associated hydrates, and basic sulfates: 1PbO·PbSO4, 3PbO·PbSO4·H2O, 4PbO·PbSO4), and mixtures thereof. In addition, the negative active material may also contain fiber and/or "expander" additives which may help maintain the active material structure and improve performance characteristics, among other things. Different materials may be used in connection with the lead-containing paste composition, with the present invention not being restricted to any particular materials or mixtures (added fibers, or other constituents). These materials may be employed alone or in combination as determined by numerous factors, including for example, the intended use of the battery and the other materials employed in the battery.

The various lead oxides may be generally made by reacting the pure lead metal with oxygen in the air. Various processes are used to create lead oxide, one of which is the ball mill process. Certain ball mill devices and processes suffer from various drawbacks, as explained in further detail below.

SUMMARY

An improved ball mill cooling system and method is provided for the production of leady oxides. Among other features, the improved system employs both internal and external cooling to the ball mill during the oxide production process.

More specifically, a cooling system for a ball mill used for production of a lead oxide is disclosed. The system has an internal nozzle configured to introduce water into an interior of a rotating ball mill drum, and a water conduit on an exterior of the rotating drum and configured for external water delivery so as to deliver water on the drum exterior. A water source is provided in communication with the internal nozzle and nozzle configured for external water delivery. A control system is also provided in communication with the internal nozzle and the water conduit to activate the internal nozzle and/or water conduit, and in communication with one or more sensors configured to monitor a condition of the rotating drum or materials contained therein.

A method of production of a leady oxide using a ball mill is also disclosed. The method includes introducing a load of lead to an interior of a rotating drum of the ball mill; operating the rotating drum to rotate; moving air through the rotating drum by maintaining an inlet differential pressure; and cooling the rotating drum of the ball mill. Cooling comprises introducing water into the interior of the ball mill drum in response to and based upon a condition of the ball mill and introducing water on an exterior of the ball mill drum in response to and based upon the condition of the ball mill.

A ball mill for production of a lead oxide is also disclosed. The ball mill includes a rotating drum operably connected to a motor for rotation of the drum. The rotating drum has one or more agitators therein. A pellet feed chute is positioned for delivery of material for production of lead oxide to the rotating drum. An internal nozzle is configured to introduce water for a period of time into an interior of the ball mill drum. A water conduit is provided on an exterior of the rotating drum and configured for external water delivery so as to deliver water on the drum exterior. A water source is in communication with the internal nozzle and nozzle configured for external water delivery.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

According to one or more examples of embodiments, lead oxide, which is used to create the paste used on battery plates, is produced by a ball mill process.

In the ball mill process, typically high-purity lead in various size configurations is allowed to tumble in a rotating mill or drum. The drum acts much like a rock tumbler or clothes dryer. The drum in has agitators that tumble the raw lead material inside. The tumbling causes collisions with the lead particles, causing smaller particles to form, react with heat and oxidize into a combination of lead and lead oxide (leady oxide or oxide). The motion produces heat which, in turn, causes the lead to oxidize. More specifically, lead pigs, or ingots are charged with air into a ball mill. Frictional heat generated by the tumbling lead ingots initiates an oxidation reaction. Oxygen in the air, assisted by the heat of the tumbling lead, reacts with the lead to produce lead oxide. During milling, the lead oxide that forms on the surface of the ingots and fine particles of un-oxidized lead are broken off, forming a fine dust that may be removed from the mill by a circulating air stream. Centrifugal mills and cyclones are often used to collect large particles, while the finer particles are often collected in a baghouse. The resultant output of a ball mill process, in one or more examples of embodiments, is a lead oxide and, in some examples, unreacted free lead. For instance, this output may consist of 70-75 weight percent (wt %) of a leady oxide with the remainder being free lead (e.g., 25%-30%). While some free lead becomes pasted into the battery plate during manufacture of a battery, remaining free lead that is not cured in a pasted plate is waste.

Figure 1:
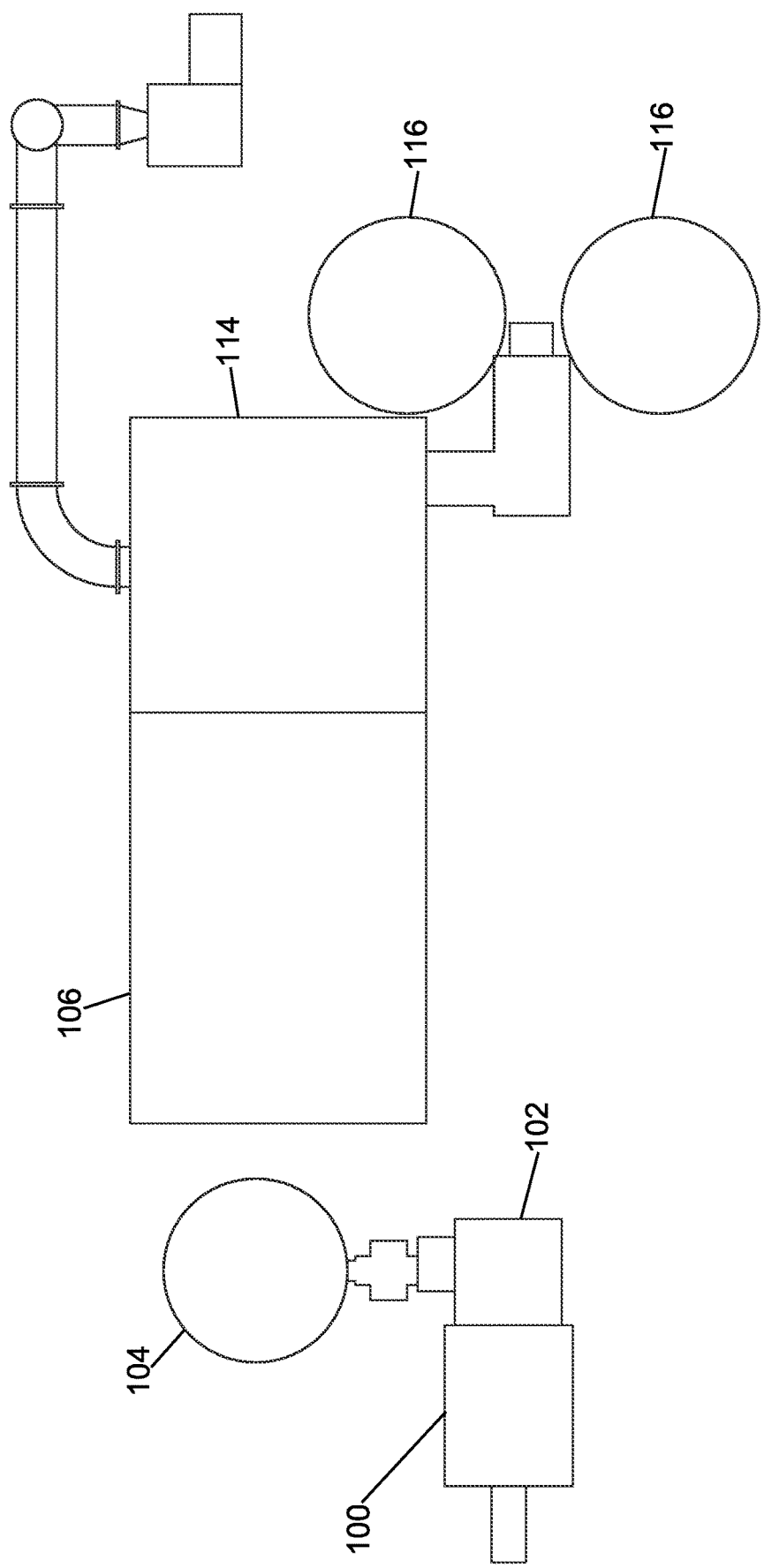
FIG. 1 is a schematic view of a ball mill lead oxide manufacturing facility.

In another example described in reference to FIG. 1, lead ingots are melted in a melting pot 100. The molten lead in the melting pot 100 is pumped onto a cylinder casting machine 102. Lead cylinders are casted in the cylinder casting machines 102 at a rate higher than that of the oxidation process. These lead cylinders are conveyed and stored in a silo 104. The silo 104 feeds the required amount of lead cylinders into the ball mill 106 as, and when, required. The amount of lead cylinders being discharged from the silo 104 is adjustable from, for example a control system or PLC system 108.

As indicated, lead cylinders tumbling inside the ball mill drum 110 create heat due to friction between them. This heat initiates the oxidation process. The oxidation process is also an exothermic reaction. This exothermic heat raises the temperature of the material which in turn accelerates the oxidation process. Reaction temperature is monitored using sensors or thermocouples 112 and is controlled by periodic water cooling.

A draft of air through the ball mill drum 110 gives oxygen for the oxidation process and also carries the battery lead oxide to a collection system. The collection system may include a combination of cyclone and dust collector or just dust collector 114. Lead oxide is collected and conveyed to storage silos 116. The silos 116 storing battery oxide in some examples, are purged with nitrogen to keep the temperature of the oxide in check.

In some examples of embodiments, the ball mill process may take place on or in a 24 T (24 ton) system. In other examples of embodiments, the ball mill process may take place on or in a 30 T (30 ton) system. Note, the "ton" or "T" designation relates to the amount of oxide that can be created in a twenty-four (24) hour period. Thus, the 30 T ball mill is capable of producing a greater volume of lead oxide in the same period of time as a 24 T ball mill.

Figure 2:
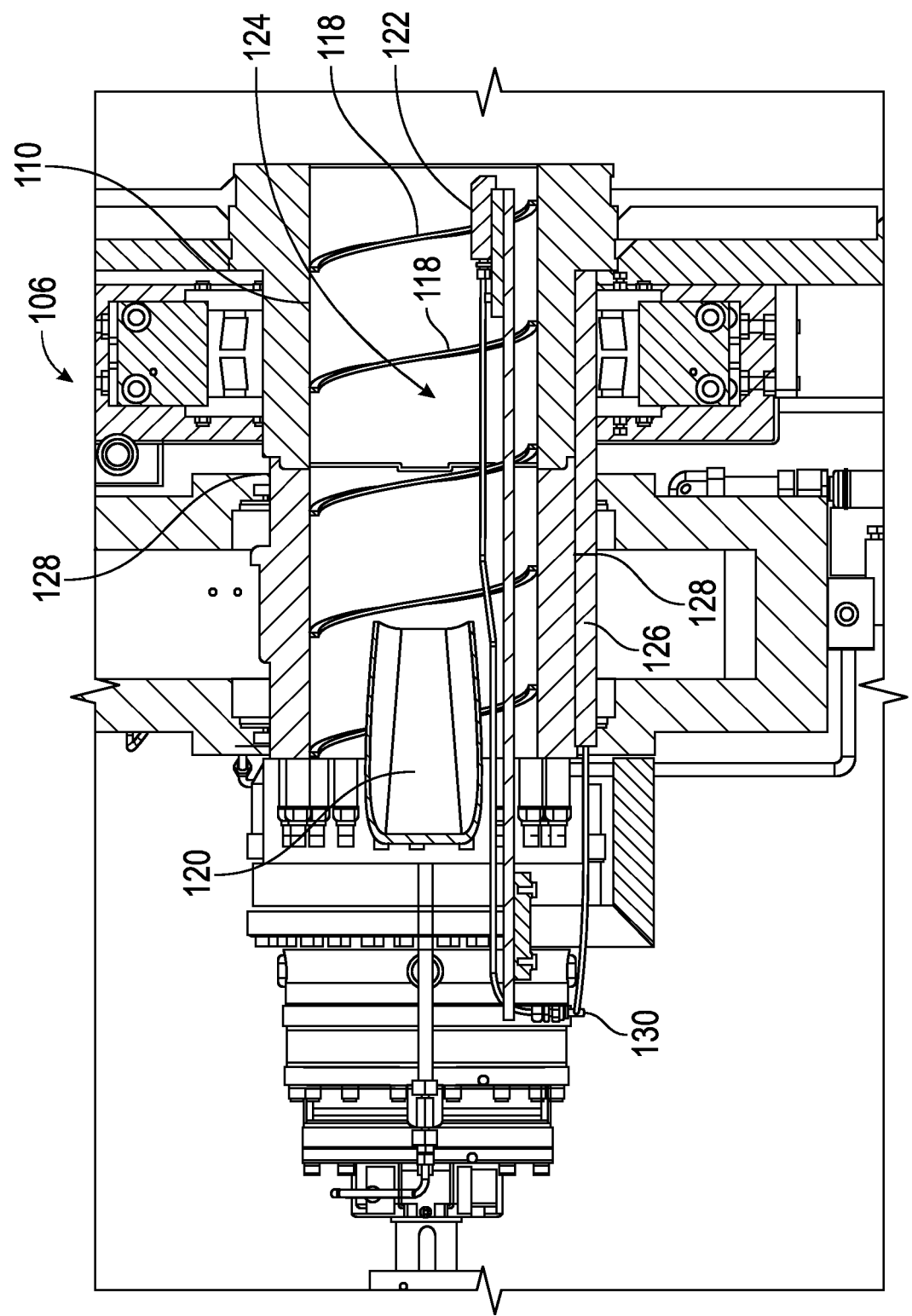
FIG. 2 is a cut away view of an example ball mill for use with the method and system described herein having combined cooling.

As indicated, reaction temperature is monitored using sensors or thermocouples 112 and is controlled by periodic water cooling. In the ball mill 106 disclosed herein, a novel cooling system is employed. An example ball mill 106 with a combined cooling (both internal cooling and external cooling) is shown in FIG. 2. In one or more examples of embodiments, the ball mill 106 is a 30 T ball mill. The ball mill 106, for production of a lead oxide, has a rotating drum 110 operably connected to a motor for rotation of the drum, the rotating drum 110 having one or more agitators 118 therein. A pellet feed chute 120 is positioned for delivery of material (e.g., lead) for production of lead oxide to the drum or rotating drum 110. An internal nozzle 122 is provided and configured to introduce water into an interior 124 of the ball mill drum 110. In one or more examples of embodiments, the internal nozzle 122 may be positioned inside the drum 110 adjacent the pellet feed chute 120 entrance. A water conduit 126 is also provided, located on an exterior 128 of the rotating drum 110 and configured for external water delivery so as to deliver water on the drum exterior 128. In some examples, the water conduit 126 extends the entire length of the drum 110. A water source 130 is also provided in communication with the internal nozzle 122 and conduit 126 configured for external water delivery.

As indicated, the oxidation reaction is exothermic and thus provides heat which may accelerate the process, but can become too hot for suitable production requirements if not adequately controlled. Thus, in one or more examples of embodiments, the temperature of the ball mill process is controlled. Accordingly, a control system or PLC (programmable logic controller) 108 may also be provided in communication with the internal nozzle 122, the water conduit 126, and/or the water source 130, to activate the delivery of water through the internal nozzle and/or water conduit, and is in communication with one or more sensors 112 or the thermocouple configured to monitor a condition of the rotating drum 110 or materials contained therein (see FIG. 3). The sensors 112 or thermocouple are configured to deliver a signal to the control system in response to the condition communicating the condition. The control system may then make a decision to deliver water or cease the delivery of water through the combined cooling system water delivery mechanism, namely, the interior nozzle 122 and/or water conduit 126.

Traditionally, the 24 T ball mill is cooled internally. In other words, in order to counteract the heat generated by the oxidation reaction and to control the temperature, in a 24 T ball mill, water is introduced into the rotating drum. This may be accomplished by spraying water internally with a nozzle for a period of time at certain intervals based upon, for example, the temperature of the mill. For instance, traditional 24 T oxide ball mills are temperature regulated with water spraying internally on the side of a rotating drum, immediately behind the pellet entrance chute.

Unlike the 24 T ball mill, due to the increased size of the drum, a 30 T ball mill is traditionally cooled externally (on the outside of the drum) as internal cooling has traditionally been found to be ineffective in the larger volume mill. Thus, internal water spray is completely absent in the traditional 30 T ball mill. More specifically, in order to cool the 30 T ball mill and/or maintain a temperature or range of temperature, a pipe or other conduit is provided along an entire length of the drum, externally. The pipe sprays water down the side of the drum for a period of time, for example, at various intervals based upon, in some examples, the temperature of the mill, to cool the mill. Excess water typically goes to a drain.

Notably, the impact of the different cooling methods (i.e., cooling the typical 24 T ball mill vs. cooling the typical 30 T ball mill) has been found to cause completely different reactions. More specifically, each traditional cooling method results in a different shape of oxide material with different reactivity. There is also a change in surface area of the lead oxide. Further, there is a distinct rheological difference between the oxides produced from the two traditional units. Moreover, the oxide produced from the traditional 30 T ball mill does not react the same as the oxide produced from the 24 T ball mill. As a result, different paste recipes are often required or used for battery paste production using the traditional ball mills depending upon the mill size/volume, which can be inefficient and problematic for battery manufacturing.

Accordingly, a novel method of production of a leady oxide using a ball mill, and in particular, a 30 T ball mill 106 is provided herein. The method includes introducing a load of lead to an interior of a rotating drum 110 of the ball mill 106 ranging from approximately 40 percent to 60 percent lead. The rotating drum 110 is operated to rotate at a desired torque. Air is moved through the rotating drum 110 by maintaining an inlet differential pressure. The rotating drum 110 is cooled during the process by introducing water into the interior 124 of a ball mill drum 110 in response to and based upon a condition of the ball mill, and introducing water on an exterior 128 of the ball mill drum 110 in response to and based upon the condition of the ball mill. Water may be fed from the same location as external cooling, or from a different location. Both flow rate and frequency of water delivery may be controlled. Various conditions may be used to trigger the cooling mechanism, i.e., water delivery. In one example, the condition of the ball mill is a temperature of the drum or materials therein. In another example, the condition of the ball mill is a time or period of time. In a further example, the condition of the ball mill is volume of water. In some examples of embodiments, the cooling process may be automated. In other examples of embodiments, the cooling process may be manually operated.

Figure 3:
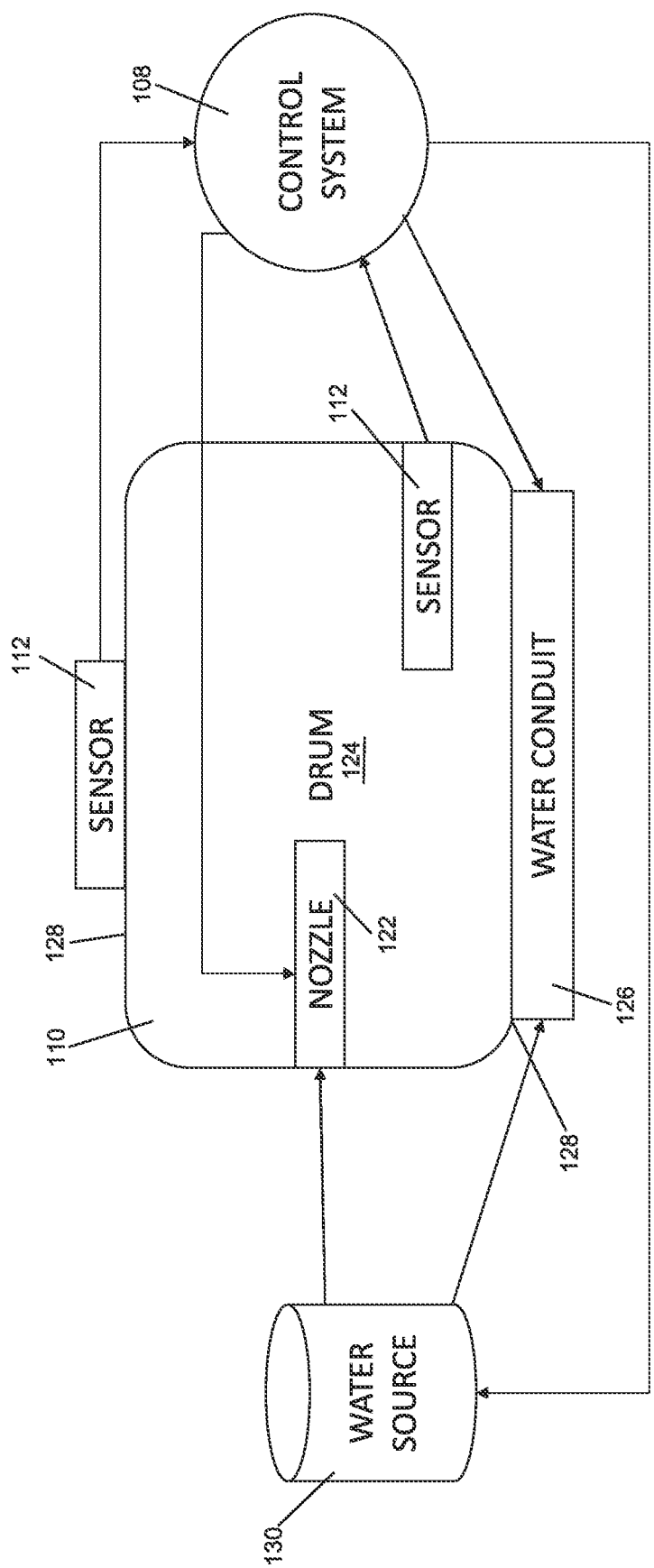
FIG. 3 is a block diagram illustrating a control system for cooling a ball mill according to one or more examples of embodiments described herein.
Figure 4:
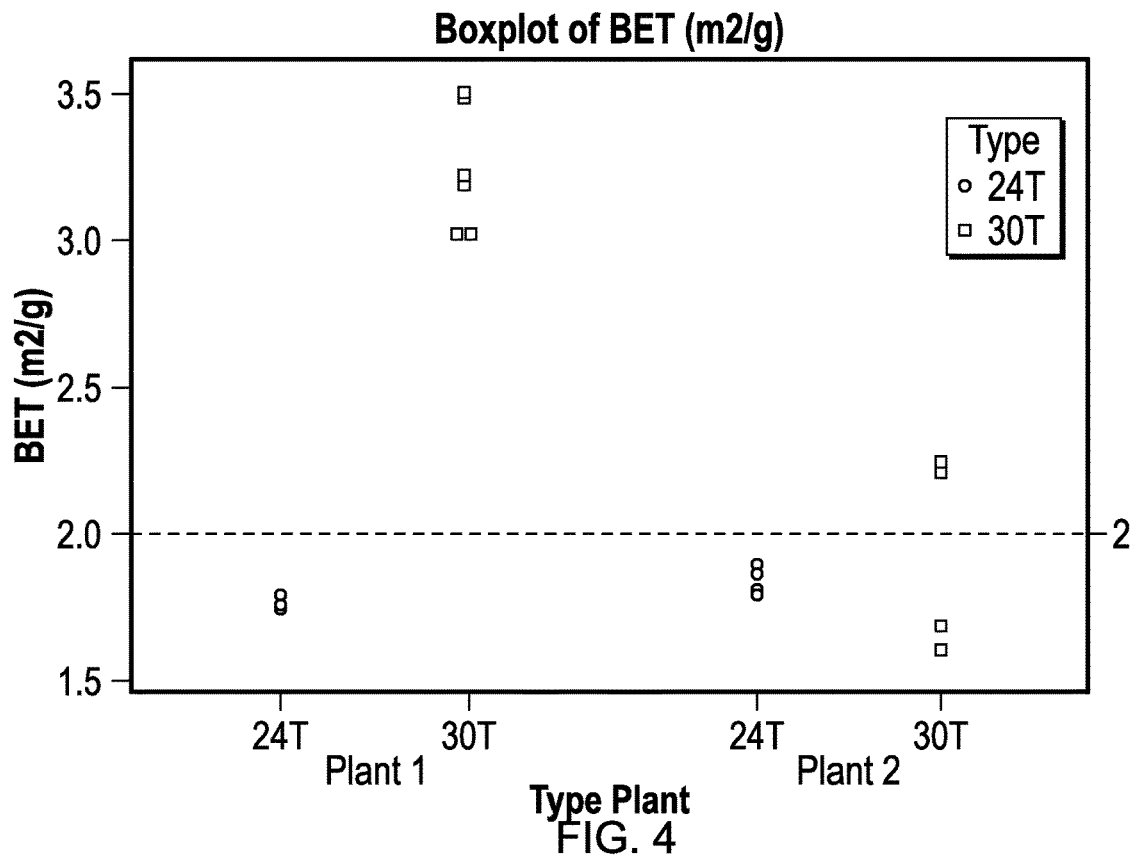
FIG. 4 illustrates sample test results of one or more experiments, showing a boxplot of BET test results.
Figure 5:
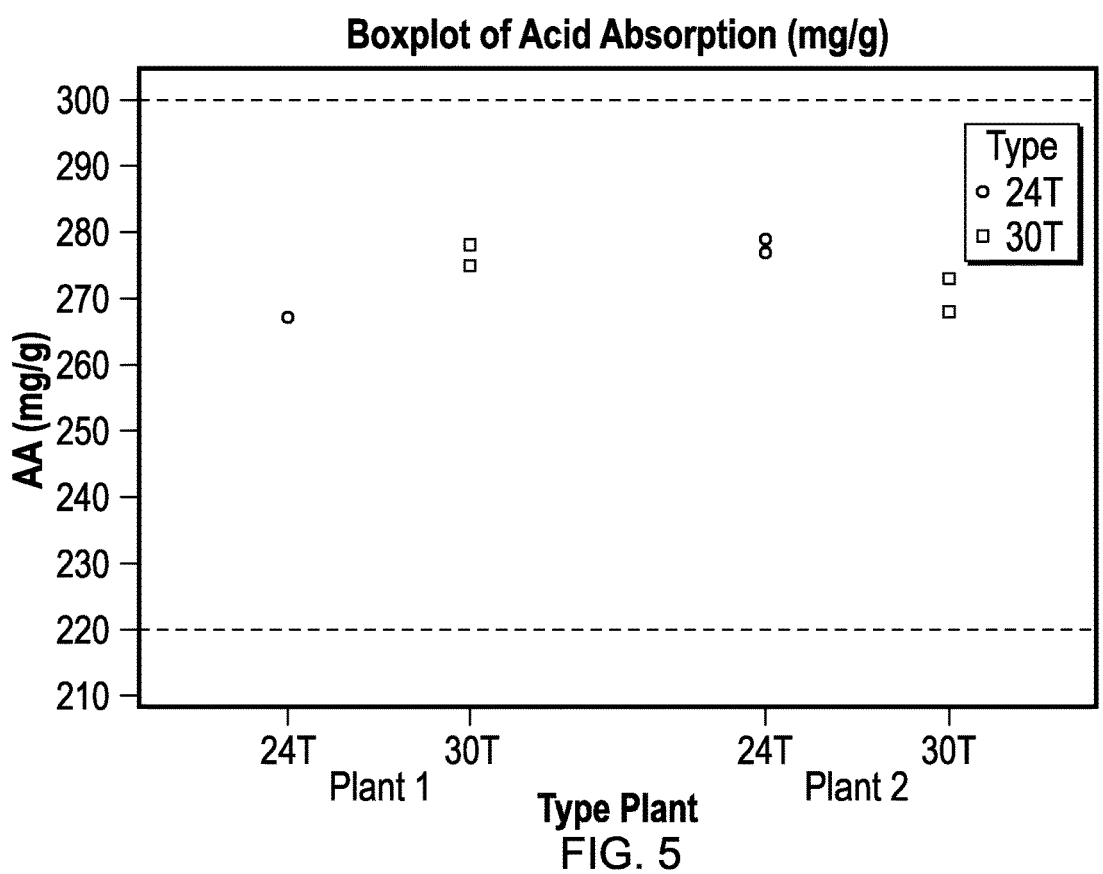
FIG. 5 illustrates sample test results of one or more experiments, showing a boxplot of acid absorption values.

To accomplish the foregoing method, a cooling system for a ball mill, and in particular a 30 T ball may, is provided for production of a lead oxide. The system has an internal nozzle 122 configured to introduce water into an interior 124 of a ball mill drum, a water conduit 126 on an exterior 128 of the drum 110 or rotating drum and configured for external water delivery so as to deliver water on the drum exterior, and a water source 130 in communication with the internal nozzle and nozzle configured for external water delivery. Thus, external water delivery is provided along the exterior of the drum and an internal nozzle 122 for water delivery may be placed inside the drum, for example adjacent the pellet feed chute 120 of the drum. Water may be fed to the internal nozzle 122 from the same location as the external cooling water delivery system. Referring to FIG. 3, a control system 108, which may be a PLC, is provided in communication with the internal nozzle 122, the water conduit 126, and/or the water source 130 to activate the cooling system (i.e., the internal nozzle and water conduit and/or water source), namely, to trigger the delivery of cooling water. The control system 108 is therefore also in communication with one or more sensors 112, such as but not limited to thermocouples, configured to monitor a condition of the drum 110 or rotating drum or materials contained therein and deliver a signal to the control system.

Accordingly, an improved ball mill system and method is provided herein. In one or more examples of embodiments, the ball mill is cooled internally and externally. That is, a combined cooling system is used in which water is introduced for a period of time into the drum by spraying water internally with a nozzle at certain intervals based upon a condition, for example, the temperature of the drum or mill, and water is also sprayed down the outside or exterior of the drum for a period of time at certain intervals based upon a condition, for example, upon the temperature of the mill, in order to cool the mill, with the excess water going to drain.

The ball mill may be operated according to one or more of the following example parameters alone or in any combination. For instance, the ball mill may operate at a temperature ranging from approximately 120 degrees C. to 150 degrees C. In another example, the ball mill may have a load, e.g., the amount of lead inside of the mill, ranging from approximately 30 percent to 70 percent lead (1 percent load=approximately 200 kg of lead). In a further example, the ball mill may operate or rotate with a torque (kg) of approximately 2500 to 8500. In another example, the inlet differential pressure, e.g., the air moving through the mill, may range from approximately 10 mmH20 to 70 mmH20. In another example of embodiments, the quality of the water used for internal and/or external cooling may also be adjusted. Mill settings may also dictate flow rate and frequency of cooling water delivery. While various and specific examples are described, one of skill in the art will appreciate modifications can be made for the intended purposes without departing from the overall scope of the present invention. For example, while water may be introduced based upon temperature and/or time, it is also contemplated that water may be introduced based upon volume or other factors or manufacturing characteristics designed to achieve the desired paste recipe.

While the system and methods described herein are specifically described for use with a 30 T ball mill, one of skill in the art will appreciate that the same system and methods may be equally applicable to and effective in alternative size mills—both larger and smaller than 30 T. Likewise, while water is described herein one of skill in the art will appreciate that other liquids may be suitable for the purposes of the present invention.

EXAMPLES

The following Examples are an illustration of one or more examples of embodiments of carrying out the invention and are not intended as to limit the scope of the invention. As will be seen from the following examples of experimental results, various parameters are improved or changed as a result of the ball mall with combined cooling described herein.

Example 1

FIGS. 4-8 illustrate sample test results of one or more experiments, showing improvements in BET, acid absorption, and water absorption using the ball mill cooling method described herein.

"BET" refers to Brunauer-Emmett-Teller (BET) theory which is commonly used to evaluate the gas absorption data and generate a specific surface area result, expressed in units of area per mass of sample (m2/g). In this test, generally, prior to analysis, physically bonded impurities are removed from the surface of the sample to be tested by degassing or outgassing. The specific surface area of a material may then be determined by the physical adsorption of a gas (such as, nitrogen, krypton, or argon depending on the expected surface area and the properties of the sample) onto the surface of the sample at cryogenic temperatures (typically liquid nitrogen or liquid argon temperatures). Once the amount of adsorbate gas has been measured (either by a volumetric or continuous flow technique), calculations which assume a monomolecular layer of the known gas are applied. The results are shown in a boxplot. According to literature, BET results for the oxides measured typically range from 0.5 $m^2/g$ to 2 $m^2/g$.

Acid absorption ("AA") is a routine analytical method often used in the manufacturing of lead oxide used to manufacture lead acid battery paste and/or electrodes. Generally, the acid absorption of the material is determined by a standard but empirical procedure in which a weighed amount of the sample is treated with sulfuric acid, and the amount of the acid absorbed is determined. Results are determined as milligrams of sulfuric acid per gram of lead oxide (mg $H_2SO_4$/g PbO). According to literature, typical test results range between 220 mg $H_2SO_4$/g PbO to 300 mg $H_2SO_4$/g PbO.

In this example, testing was performed on ball mills in two different manufacturing plants. In each plant, multiple samples were tested on a 24 T ball mill and multiple samples were tested on a 30 T ball mill. The 24 T ball mill was operated according traditional methods with internal cooling only. The 30 T ball mill in some tests was operated under traditional methods, using only external cooling as described above, and in other tests operated implementing the improved ball mill cooling system and method described herein using both internal cooling and external cooling. The results shown in Table 1 and FIGS. 4-5 demonstrate BET and acid absorption of the lead oxide using traditional methods.

TABLE 1

BET and ACID ABSORPTION

| Plant | Mill Number | Type | Sample | BET (m2/g) | AA (mg/g) |
|---|---|---|---|---|---|
| 1 | 1 | 24T | 1 | 1.74 | 267 |
| 1 | 1 | 24T | 2 | 1.79 | |
| 1 | 10 | 30T | 1 | 3.22 | 275 |
| 1 | 10 | 30T | 2 | 3.19 | |
| 1 | 11 | 30T | 1 | 3.02 | 278 |
| 1 | 11 | 30T | 2 | 3.02 | |
| 2 | 3 | 24T | 1 | 1.79 | 277 |
| 2 | 3 | 24T | 2 | 1.8 | |
| 2 | 4 | 24T | 1 | 1.89 | 279 |
| 2 | 4 | 24T | 2 | 1.86 | |
| 2 | 5 | 30T | 1 | 2.24 | 268 |
| 2 | 5 | 30T | 2 | 2.2 | |
| 2 | 6 | 30T | 1 | 1.6 | 273 |
| 2 | 6 | 30T | 2 | 1.68 | |

Figure 6:
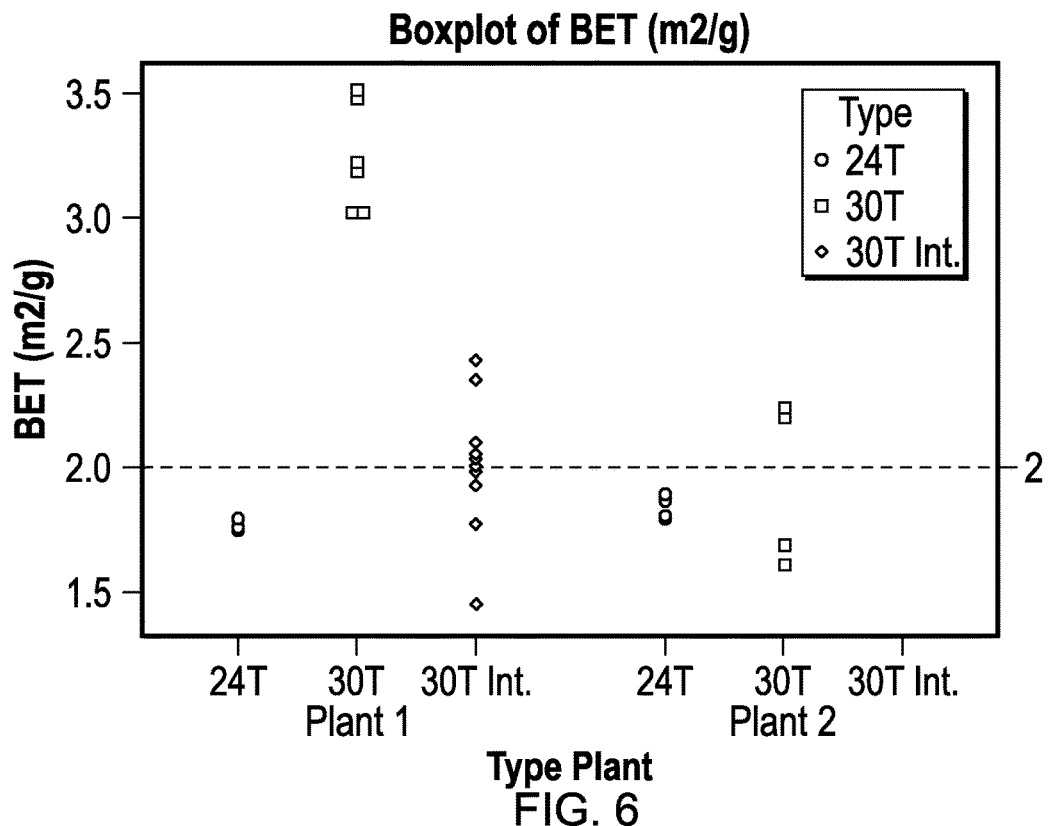
FIG. 6 illustrates sample test results of one or more experiments, showing a boxplot of BET test results.
Figure 7:
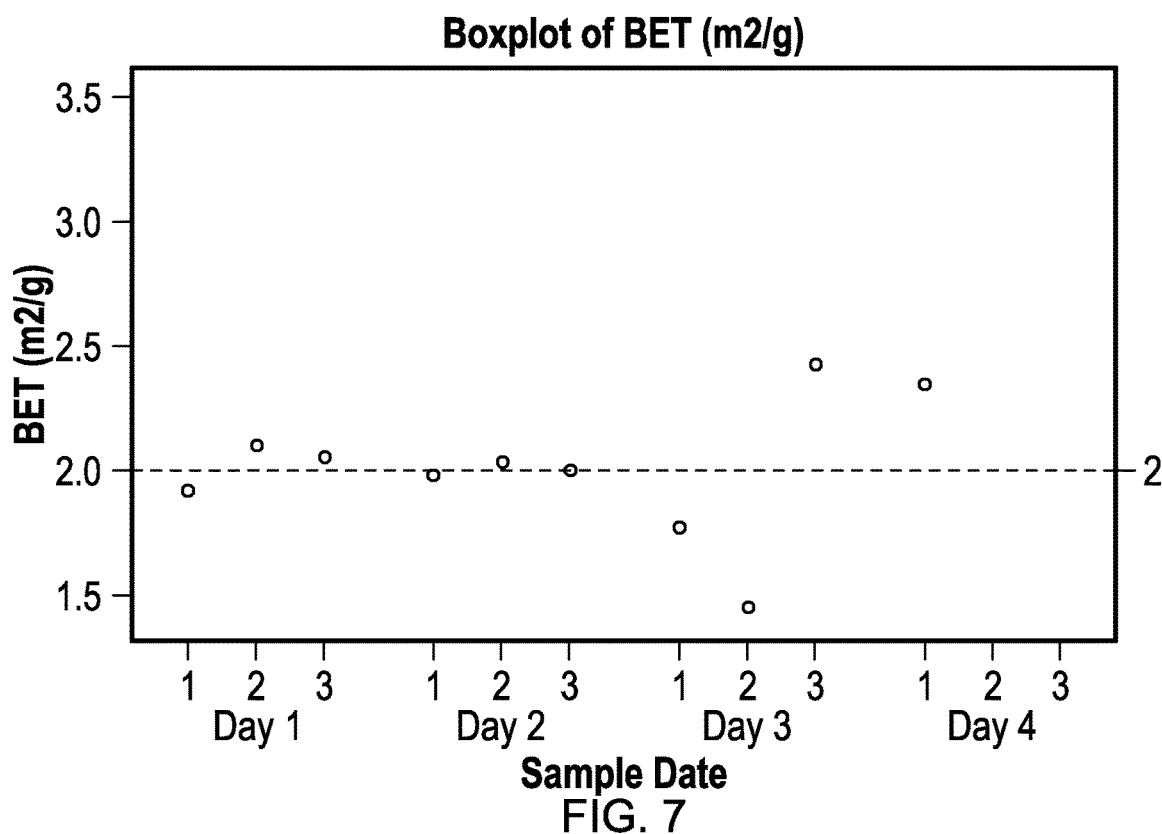
FIG. 7 illustrates sample test results of one or more experiments, showing a boxplot of BET test results.

FIGS. 6-7 and Tables 2-3 show the results of BET values after the addition of internal cooling to the 30 T ball mill. "30 T Int." used in this and other Examples herein refers to the ball mall using the novel process described herein including the addition of internal cooling and a 30 T ball mill with external cooling.

TABLE 2

BET VALUES AFTER INTERNAL COOLING ADDITION

| Mill | Sample | Day | BET (m2/g) |
|---|---|---|---|
| 10 | 1 | 1 | 1.92 |
| 10 | 2 | 1 | 2.10 |
| 10 | 3 | 1 | 2.05 |
| 10 | 1 | 2 | 1.98 |
| 10 | 2 | 2 | 2.03 |
| 10 | 3 | 2 | 2.00 |
| 10 | 1 | 3 | 1.77 |
| 10 | 2 | 3 | 1.45 |
| 10 | 3 | 3 | 2.43 |
| 10 | 1 | 4 | 2.35 |

TABLE 3

BET AVERAGE VALUES

| Plant | Type | BET Avg. (m2/g) |
|---|---|---|
| 1 | 24T | 1.76 |
| 2 | 24T | 1.84 |
| 1 | 30T | 3.24 |
| 2 | 30T | 1.93 |
| 1 | 30T Int. | 2.00 |

As can be seen from the results, in one plant, using the same ball mills, a 62 percent (%) reduction in BET surface area was shown with the addition of internal cooling to a traditional 30 T mill. Namely, a 30 T ball mill (mills 10, 11 in the illustrated example) showed a BET of between 3.0 and 3.5 m2/g or an average of 3.24 m2/g using only external cooling. In comparison, the same 30 T ball mills showed a BET ranging from around 1.5 to 2.5 m2/g or an average of 2.00 m2/g when the ball mill was operated using both external cooling and internal cooling as described herein.

Figure 8:
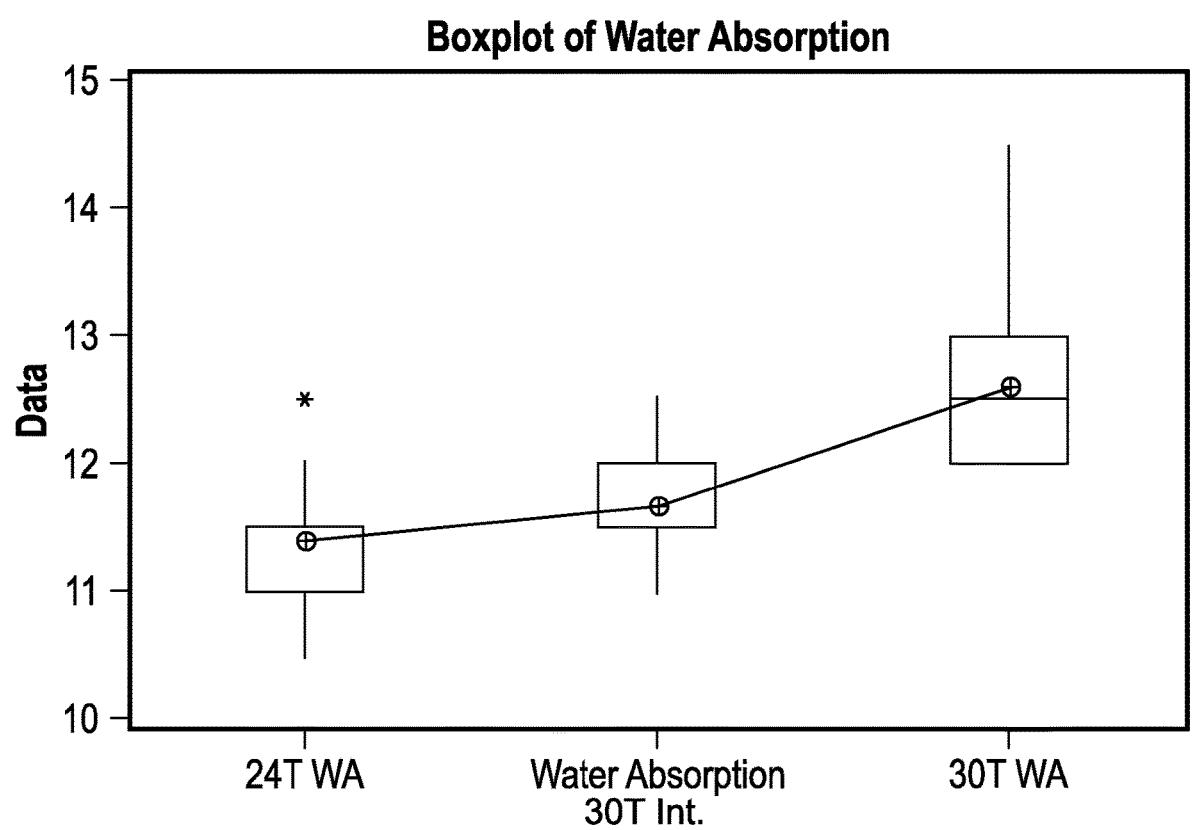
FIG. 8 illustrates sample test results of one or more experiments, showing a boxplot of water absorption values.

FIG. 8 and Table 4 show test results demonstrating water absorption by the lead oxide. Testing was performed using a traditional 24 T ball mill, a traditional 30 T ball mill, and a 30 T ball mill using both external cooling and internal cooling. Values are shown as milliliters (ml) water ($H_2O$)/100 gram (g) oxide averages.

TABLE 4

WATER ABSORPTION AVERAGE

| Type | ml H2O/100 g Oxide Average |
|---|---|
| 24T | 11.39 ml |
| 30T | 12.59 ml |
| 30T Int. | 11.65 ml |

As can be seen from the results, 30 T ball mill lead oxide paste recipes produced without internal cooling (i.e., produced under traditional methods with external cooling only) required approximately 25 pounds (lb) extra water as compared to the 30 T ball mill with both internal cooling and external cooling. The 30 T ball mill with external and internal cooling operated similar to the 24 T ball mill, requiring approximately 5 lb extra water as compared to a 24 T ball mill. Moreover, the results showed much less variance in mix recipe consistency and water use due to the addition of internal cooling in the 30 T ball mill.

Example 2

The novel ball mill and cooling method described herein was also tested for free lead which results during the formation of lead oxide. Leady oxide consists of metallic lead (Pb) and oxidized lead (PbO). "Free lead" is the uncovered metallic portion of the leady oxide. Generally, the higher the free lead, the less growth of the final lead oxide product. While a certain amount of free lead is desirable, the higher the free lead the higher the conversion cost and time which decreases throughput of the process.

Figure 9:
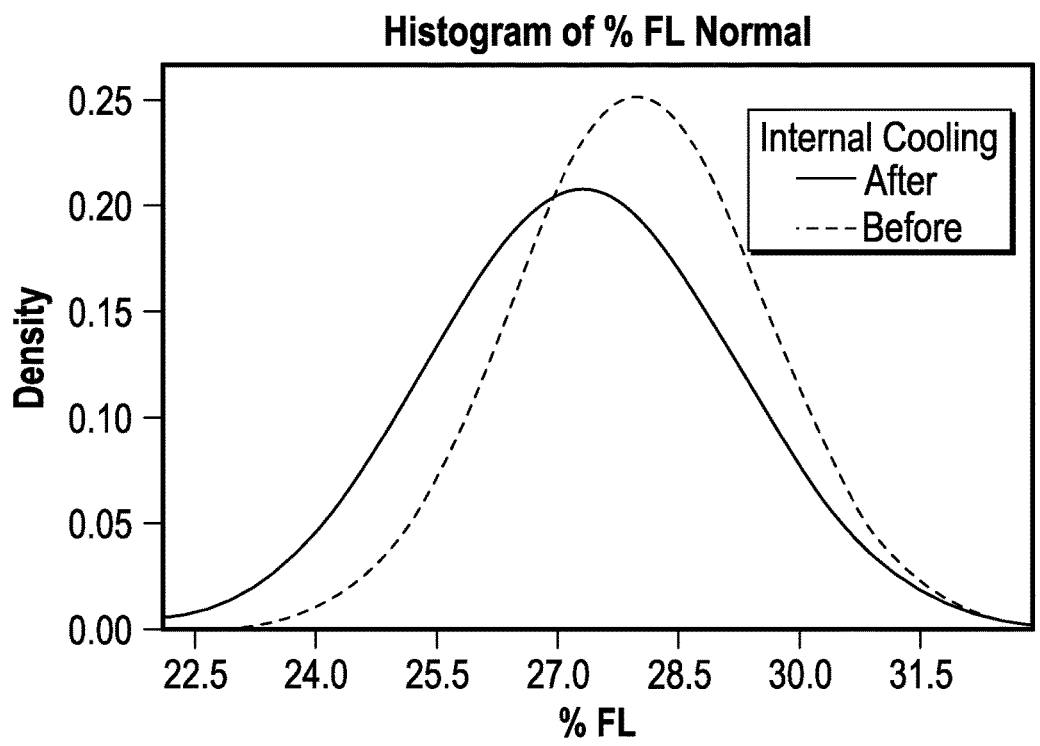
FIG. 9 illustrates sample test results of one or more experiments, showing a histogram of percentage of free lead.
Figure 10:
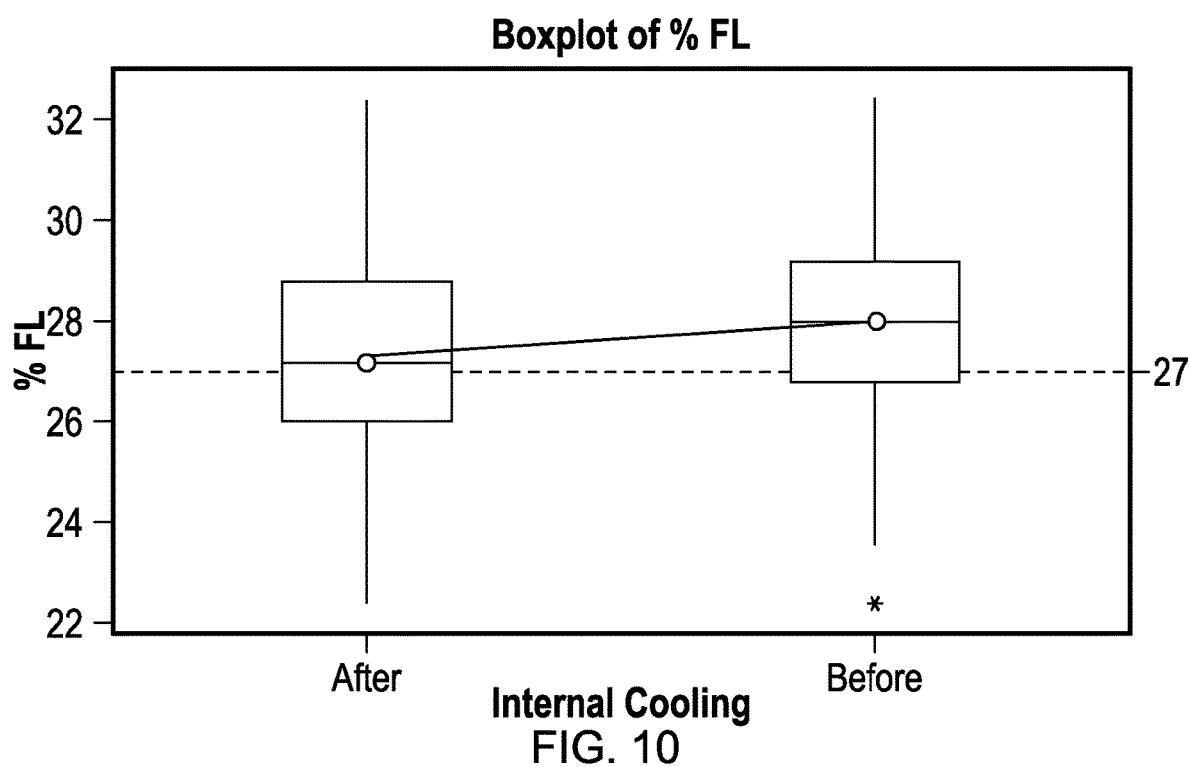
FIG. 10 illustrates sample test results of one or more experiments, showing a boxplot of percentage of free lead.
Figure 11:
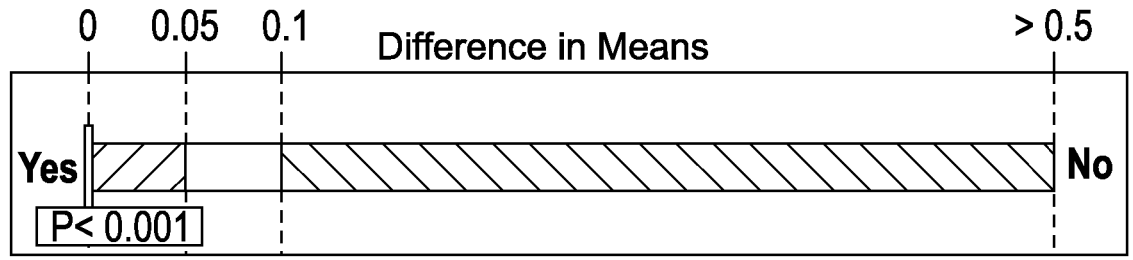
FIG. 11 illustrates sample test results of one or more experiments, showing the distribution of data and a summary of the percentage of free lead resulting from cooling a ball mill with external cooling only, and cooling a ball mill with both internal cooling and external cooling as described herein.
Figure 11:
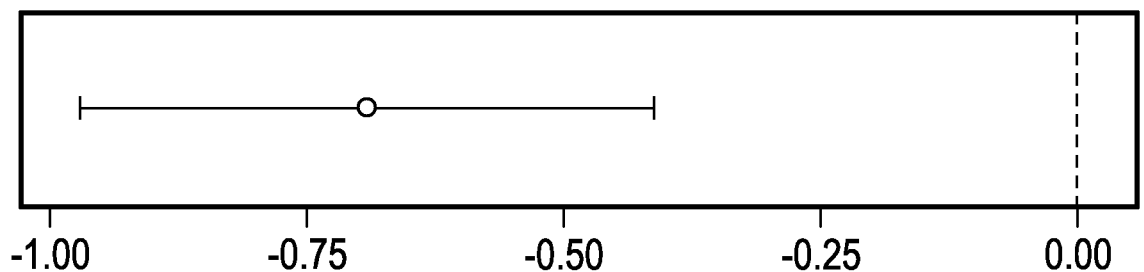
Figure 11:
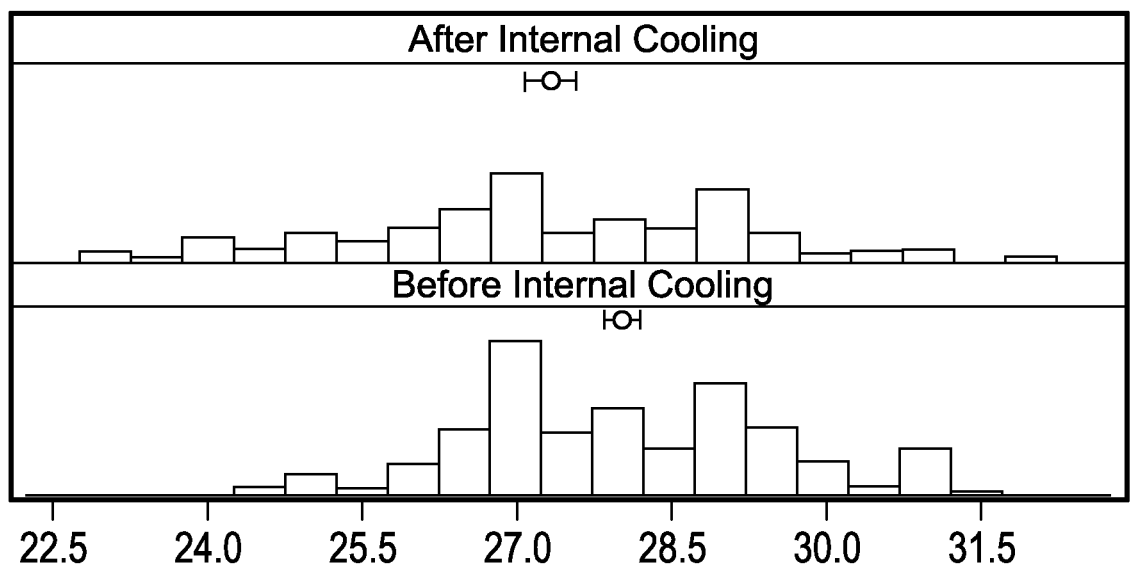

The results of various tests for free lead are shown in FIGS. 9-11 and Tables 5-6. In FIG. 9, the percentage of free lead is plotted against density. As can be seen, the measured percentage of free lead has a peak density with a mean percentage of free lead of approximately 28.00 with only external cooling (and a higher density) as compared to a lower peak density with a lower mean percentage of free lead of approximately 27.31 with the addition of internal cooling (including internal and external cooling). A similar reduction in the percentage of free lead is reflected in the boxplot shown in FIG. 10, where after the addition of internal cooling to the ball mill, the percentage of free lead is lower.

Two samples were tested over the course of several months for the percentage of free lead on a 30 T ball mill with external cooling only and on a 30 T ball mill with both internal and external cooling. The results are shown in Tables 5-6. "Before IC" and "After IC" refer to the installation of internal cooling.

TABLE 5

RESULTS OF 2-SAMPLE TEST FOR PERCENTAGE OF FREE LEAD

| Internal Cooling (IC) | Month | Mean | N | Average |
|---|---|---|---|---|
| Before IC | 1 | 28.29 | 84 | 28.00 |
|  | 2 | 27.84 | 66 |  |
|  | 3 | 28.27 | 100 |  |
|  | 4 | 27.60 | 89 |  |
|  | 5 | 27.90 | 66 |  |
| After IC | 6 | 27.04 | 105 | 27.31 |
|  | 7 | 27.65 | 130 |  |
|  | 8 | 26.74 | 28 |  |

TABLE 6

SPECIFICATION RANGE

| % Free Lead | % PbO | kg Pb/kg leady oxide | Conversion Rate (%) | kg leady oxide/kg Pb |
|---|---|---|---|---|
| 22.00 | 78.00 | 0.94409 | 5.92233 | 1.05922 |
| 23.00 | 77.00 | 0.94480 | 5.84197 | 1.05842 |
| 24.00 | 76.00 | 0.94552 | 5.76173 | 1.05762 |
| 25.00 | 75.00 | 0.94624 | 5.68161 | 1.05682 |
| 26.00 | 74.00 | 0.94696 | 5.60161 | 1.05602 |
| 27.00 | 73.00 | 0.94767 | 5.52173 | 1.05522 |
| 28.00 | 72.00 | 0.94839 | 5.44198 | 1.05442 |
| 29.00 | 71.00 | 0.94911 | 5.36234 | 1.05362 |
| 30.00 | 70.00 | 0.94982 | 5.28283 | 1.05283 |
| 31.00 | 69.00 | 0.95054 | 5.20343 | 1.05203 |
| 32.00 | 68.00 | 0.95126 | 5.12415 | 1.05124 |

FIG. 11 provides a summary and comparison of a two samples tested for percentage of free lead resulting from cooling a ball mill with external cooling only, and cooling a ball mill with both internal cooling and external cooling as described herein. The mean percentage of free lead and distribution of data is significantly different from the mean percentage of free lead and distribution of data after the addition of internal cooling. The entire interval (95% CI) is below zero.

As can be seen by the foregoing example, an improvement is shown in the amount of free lead, namely a reduction in free lead resulting from the combined cooling process. When considering a volume of manufacture or production, even a small (e.g., less than 1 percent) decrease in free lead without decrease in production is significant.

Example 3

Figure 12:
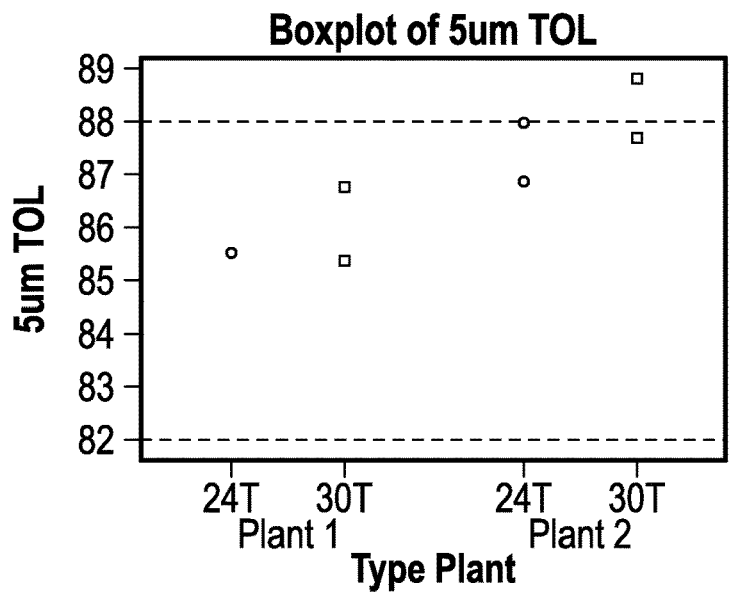
FIG. 12 illustrates sample test results of one or more experiments, showing a boxplot of 5 micrometer TOL demonstrating particle sizes.
Figure 13:
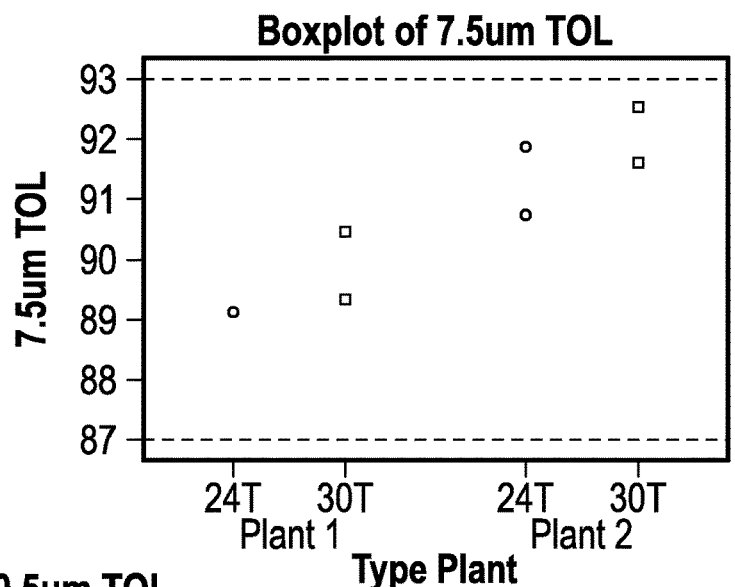
FIG. 13 illustrates sample test results of one or more experiments, showing a boxplot of 7.5 micrometer TOL demonstrating particle sizes.
Figure 14:
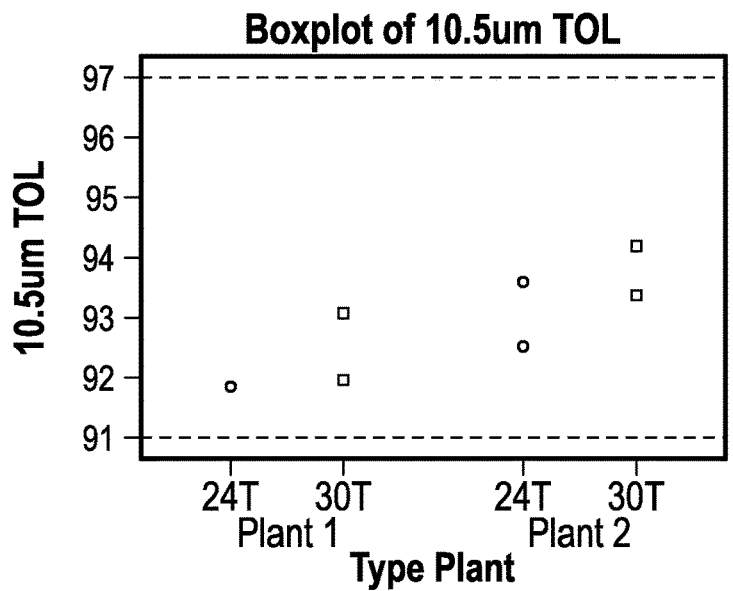
FIG. 14 illustrates sample test results of one or more experiments, showing a boxplot of 10.5 micrometer TOL demonstrating particle sizes.

In another example, 24 T and 30 T ball mills were tested for apparent density, evaluating particle sizes in the respective mills. Multiple mills in multiple plants were tested. Each mill sample was measured using HELOS particle distribution sensor(s). The specification is as follows: 5 micrometers (um)_85±3% TOL; 7.5 um_90±3% TOL; 10.5 um_94±3% TOL. FIGS. 12-14 and Table 7 illustrate sample test results showing an apparent density, namely, example indications of particle sizes in 24 T and 30 T ball mills.

TABLE 7

PARTICLE SIZE TEST RESULTS

| Plant | Mill | Type | 5 um | 7.5 um | 10.5 um |
|---|---|---|---|---|---|
| 1 | 1 | 24T | 85.51 | 89.10 | 91.83 |
| 1 | 10 | 30T | 85.37 | 89.33 | 91.94 |

TABLE 7-continued

PARTICLE SIZE TEST RESULTS

| Plant | Mill | Type | 5 um | 7.5 um | 10.5 um |
|---|---|---|---|---|---|
| 1 | 11 | 30T | 86.77 | 90.45 | 93.06 |
| 2 | 3 | 24T | 86.87 | 90.72 | 92.51 |
| 2 | 4 | 24T | 87.97 | 91.86 | 93.59 |
| 2 | 5 | 30T | 87.69 | 91.61 | 93.37 |
| 2 | 6 | 30T | 88.81 | 92.54 | 94.19 |

As indicated above in previous examples, in some examples ball mills 10, 11 included external and internal cooling according to the novel process described herein. As can be seen, the 30 T ball mill shows a general increase in TOL value over 24 T ball mills.

While various and specific examples are described hereinabove, one of skill in the art will appreciate additional tests and examples can be provided, and modifications can be made for the intended purposes without departing from the overall scope of the present invention. For example, other factors which may be measured and/or improved are impurities and surface area, among others.

As can be seen by the foregoing, as a result of the combined cooling process for the 30 T ball mill, the surface area of the lead oxide decreases, and in some examples of embodiments, may be similar in surface area to the product of the 24 T process. Moreover, the combined cooling process results in a lowering of free lead. For example, in some examples of embodiments, the combined cooling process in the 30 T ball mill results in a drop of 2-3% in free lead from the typical output of the 24 T process. Note, in comparison, in order to generate a drop in free lead, the production volume of the traditional 24 T process would need to be slowed. This indicates an increase in the reaction occurring in the 30 T ball mill with combined cooling and throughput of the mill. Thus, incorporating internal water in a 30 T ball mill allows for additional cooling of the 30 T ball mill unit, which also allows for increased loading and, consequently, increased production, resulting in an increase in throughput of the machine.

In addition to cooling the mill, in the improved system and method described herein with combined cooling (internal and external) further oxidation and other chemical reactions may occur from the introduction of water and water vapor directly into the mill. The rheology of the paste mix may also change due to increased reactivity of the oxide produced with internal water. That is, the combined cooling system, namely, the additional of internal water to the externally cooled 30 T ball mill, changes the characteristics of the oxide produced which allows for a more consistent pasting operation during battery plate manufacturing, as well as increased oxidation of the leady oxide product. Thus, a similar paste recipe as used for the 24 T process may be used in the 30 T ball mill as a result of the combined cooling process.

Accordingly, the combined cooling process for the 30 T ball mill aligns the mix recipes with the 24 T mill process, shows physical changes in the final product as compared to the original 30 T ball mill process, and a different reaction inside the mill due to internal cooling, e.g., catalyzing the reaction in addition to cooling, namely, catalyzing the reaction with water vapor. At the same time, throughput of the ball mill can be increased. In view of the various advantages described above, the method and system described herein allow the manufacturer to run a higher volume/load and at an increased speed, improving throughput of the ball mill. The increased throughput and changed composition of the leady oxide also helps improve performance in the final battery product and rate of manufacture of the final battery product.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A cooling system for a ball mill used for production of a lead oxide, the system comprising:
    an internal nozzle configured to introduce water into an interior of a ball mill rotating drum;
    a water conduit on an exterior of the rotating drum and configured for external water delivery so as to deliver water on the drum exterior;
    a water source in communication with the internal nozzle and water conduit configured for external water delivery; and
    a control system in communication with the internal nozzle, the water conduit, and/or the water source, to activate the water source, nozzle, and/or conduit and deliver water to cool the ball mill drum or materials therein, the control system also in communication with one or more sensors configured to monitor a condition of the rotating drum or materials contained therein and deliver a signal to the control system in response to the condition.

2. The system of claim 1, wherein the condition is a temperature of the drum.

3. The system of claim 1, wherein the condition is a time or period of time.

4. The system of claim 1, wherein the condition is a volume of water.

5. The system of claim 1, wherein flow rate and frequency of water delivery are controlled.

6. The system of claim 1, wherein the ball mill is a 30 ton ball mill.

7. A lead oxide product formed by a ball mill utilizing the cooling system of claim 1.

8. A ball mill for production of a lead oxide, the ball mill comprising:
    a rotating drum operably connected to a motor for rotation of the drum, the rotating drum having one or more agitators therein;
    a pellet feed chute positioned for delivery of material for production of lead oxide to the rotating drum; and
    the cooling system of claim 1.

9. The ball mill of claim 8, wherein the internal nozzle is positioned inside the drum adjacent the pellet feed chute entrance.

10. The ball mill of claim 8, wherein the water conduit extends an entire length of the drum.

11. The ball mill of claim 8, wherein a control system is in communication with the internal nozzle and the water conduit and/or the water source, to activate the internal nozzle and/or water conduit, and is in communication with one or more sensors configured to monitor a condition of the rotating drum or materials contained therein and deliver a signal to the control system in response to the condition.

12. The ball mill of claim 8, wherein the ball mill is a 30 ton ball mill.

13. A method of production of a leady oxide using a ball mill comprising:
    introducing a load of lead to an interior of a rotating drum of the ball mill;
    operating the rotating drum to rotate;
    moving air through the rotating drum by maintaining an inlet differential pressure; and
    cooling the rotating drum of the ball mill by:
        introducing water into the interior of a ball mill drum in response to and based upon a condition of the ball mill; and
        introducing water on an exterior of the ball mill drum in response to and based upon the condition of the ball mill.

14. The method of claim 13, wherein the ball mill is a 30 ton ball mill.

15. The method of claim 13, wherein the condition of the ball mill is a temperature of the drum.

16. The method of any of claim 13, wherein the condition of the ball mill is a time or period of time.

17. The method of claim 13, wherein the condition of the ball mill is volume of water.

18. The method of claim 13, wherein flow rate and frequency of water delivery and controlled.

19. The method of claim 13, wherein the cooling process is automated.

20. A lead oxide product formed by the method of claim 13.

* * * * *